Patented Mar. 19, 1935

1,994,492

UNITED STATES PATENT OFFICE 1,994,492

FIRE RESISTANT BINDER FINISH

Laura W. Van Dyke, Los Angeles, Calif.

No Drawing. Application July 16, 1932,
Serial No. 623,019

9 Claims. (Cl. 91—68)

My invention relates to a fire resistant binder finish composition adapted to fireproof finish wood, clay products, cloth and other products, and the objects of my invention are:

First, to provide a binder finish for coating the outer surface of various products so that the composition will readily adhere to the product and form a fire resistant cover therefor;

Second, to provide a binder finish of this class which is simple and economical to compound and which provides a covering which will not crack, chip or break, and Third, to provide a novel method of fire resistant covering materials.

With these and other objects in view as will appear hereinafter, my invention consists of a certain novel composition of ingredients and a certain method of fireproof covering materials as will be hereinafter described in detail and particularly set forth in the appended claims.

My invention consists in preparing a composition which forms a binder for and is a part of a composition for fireproof covering materials of various kinds.

In carrying out my invention I take the product to be coated, such as wood, clay products, such as hollow tile, brick or cloth fabric, then cover the surface with a solution of magnesium chloride having a strength of approximately twenty-two (22%) per cent. After which the product is covered with a mixture of magnesite and asbestos powder in equal proportions suspended in magnesium chloride. This latter mixture will adhere to the product and when dried remains permanently on the product without cracking or chipping and the product is fire resistant and durable. The coating of magnesite and asbestos is sufficiently elastic and flexible to permit driving nails therein without chipping or cracking the material.

When my process is used for cloth I add ordinary household white vinegar, approximately ten (10%) per cent. to the magnesium chloride and I have found that the magnesite and asbestos may be omitted when treating cloth. However, on heavy fabric material magnesite and asbestos may be used in the binder.

Having thus described my invention, what I claim as new and desire to secure by Letters Patent is:

1. A method of producing fire resistant binder finish consisting in taking a product and covering it with a bath of magnesium chloride forming a layer coating thereon and thereafter coating the surface of said layer coating with a mixture of magnesite and asbestos suspended in a solution of magnesium chloride.

2. A method of producing fire resistant binder finish consisting in taking a product and covering it with a bath of magnesium chloride forming a layer coating thereon and thereafter coating the surface of said layer coating with a mixture of magnesite and asbestos suspended in a solution of magnesium chloride, and vinegar approximately ten per cent. of the quantity of magnesium chloride.

3. A fire resistant binder finish composition consisting of magnesium chloride, magnesite and asbestos.

4. A fire resistant binder finish composition consisting of magnesium chloride and vinegar.

5. A fire resistant binder finish composition consisting of magnesium chloride, ninety per cent., and vinegar, ten per cent.

6. In a fire resistant binder finish, the combination with a surface to be finished of a body layer formed of magnesium chloride applied to said surface and a coating composition applied to the surface of said body layer consisting of a mixture of magnesite and asbestos suspended in magnesium chloride.

7. In a fire resistant binder finish, the combination with a surface to be finished of a body layer formed on said surface from a solution of magnesium chloride having a strength of approximately twenty-two per cent. and a coating applied to the surface of said body layer consisting of magnesite and asbestos in equal parts suspended in magnesium chloride.

8. In a fire resistant binder finish, the combination with a surface to be finished of a main body formed of a solution of magnesium chloride having a strength of approximately twenty-two per cent. applied to said surface, a coating composition applied to the surface of said main body layer consisting of a mixture of magnesite and asbestos in equal parts suspended in magnesium chloride.

9. In a fire resistant binder finish, the combination with a surface to be finished of a main body formed of a solution of magnesium chloride having a strength of approximately twenty-two per cent. applied to said surface, a coating composition applied to the surface of said main body layer consisting of a mixture of magnesite and asbestos in equal parts suspended in magnesium chloride and vinegar ten per cent. of the whole.

LAURA W. VAN DYKE.